United States Patent [19]

Lykov et al.

[11] 3,849,233

[45] Nov. 19, 1974

[54] METHOD OF PRODUCTION OF GRANULATED PRODUCT

[76] Inventors: Mikhail Vasilievich Lykov, Simonovsky val, 22, korpus 2, kv. 53; Gleb Fedorovich Rybalchenko, ulitsa Grishina, 18, kv. 73; Mikhail Alexeevich Korotkov, Selo Semenovskoe, 139, all of Moscow; Evgeny Ivanovich Dobrovolsky, Sotsgorod, Podolskaya ulitsa, 25; Inna Lukinichna Rudenko, Sotsgorod, Shkolny proezd, 4, kv. 4, both of Dneprodzerzhinsk; Oleg Vladimirovich Avilov, ulitsa Tsitadelnaya, 5/9, kv. 65, Kiev; Nikolai Panteleevich Kuz, ulitsa Bolotnikovskaya, 46, korp. 3, kv. 69, Moscow; Nikolai Ivanovich Dubinin, ulitsa Krasnoarmeiskaya, 129, kv. 52, Kiev; Lev Pavlovich Glozman, Sotsgorod, ulitsa Volgodonskaya, 1, kv. 1; Alexandr Dmitrievich Lizunkov, Sotsgorod, ulitsa Ukhtomskogo, 35, kv. 4, both of Dneprodzerzhinsk; Viktor Ivanovich Voishvilo, ulitsa Patrisa Lumumby, 60, kv. 57, Cherkassy; Khanna Isaakovna Sverdlova, Sotsgorod, Shkolny proezd, 1, kv. 3, Dneprodzerzhinsk, all of U.S.S.R.; Yakov Benedictovich Bljumberg, deceased, late of Donskaya ulitsa, 42, kv. 4, Moscow, U.S.S.R.; by Anna Benedictovna Bljumberg, executrix, Leningrad, U.S.S.R.

[22] Filed: Mar. 2, 1972

[21] Appl. No.: 231,424

Related U.S. Application Data

[63] Continuation of Ser. No. 47,156, June 17, 1970, abandoned, which is a continuation-in-part of Ser. No. 637,679, May 11, 1967, abandoned.

[52] U.S. Cl. ........ 159/48 R, 159/DIG. 3, 159/4 CC, 159/4 A
[51] Int. Cl. .......................... B01d 1/16, F26b 3/12
[58] Field of Search ............. 159/4 A, 45 R, DIG. 3, 159/4 MS, 4 R, 48 R; 23/313, 284, 259.1

[56] References Cited
UNITED STATES PATENTS

| | | | |
|---|---|---|---|
| 1,734,260 | 11/1929 | Lamont | 264/14 |
| 2,561,394 | 7/1951 | Marshall | 117/100 |
| 2,600,253 | 6/1952 | Lutz | 23/259.1 X |
| 2,684,713 | 7/1954 | Vincent | 159/4 A |
| 2,818,917 | 1/1958 | Vincent | 159/48 |
| 2,887,390 | 5/1959 | Coulter et al. | 99/199 |
| 3,036,338 | 5/1962 | Nack | 117/100 X |
| 3,202,731 | 8/1965 | Grevenstuk et al. | 117/100 X |
| 3,237,596 | 3/1966 | Grass, Jr. et al. | 117/100 X |
| 3,266,556 | 8/1966 | Malek | 23/284 X |
| 3,309,262 | 3/1967 | Copeland et al. | 162/30 |
| 3,322,181 | 5/1967 | Williams | 159/4 A |
| 3,415,665 | 12/1968 | Hussman | 159/4 CC X |
| 3,475,132 | 10/1969 | Siefert et al. | 23/259.1 |
| 3,547,179 | 12/1970 | Hussman | 159/4 CC |
| 3,735,792 | 5/1973 | Asizawa | 159/DIG. 3 X |
| 3,748,103 | 7/1973 | Bean et al. | 159/48 R X |

FOREIGN PATENTS OR APPLICATIONS

| | | | |
|---|---|---|---|
| 735,552 | 12/1963 | Canada | 159/48 R |

*Primary Examiner*—Jack Sofer
*Attorney, Agent, or Firm*—Waters, Roditi, Schwartz & Nissen

[57] ABSTRACT

A method for producing a granulated product from solutions and suspensions, residing in that a solution or a suspension is atomized by means of a gaseous heating medium. The resulting wet granules are finally dried by the gaseous heating medium whose temperature is below the melting point or decomposition temperature of the product.

4 Claims, 1 Drawing Figure

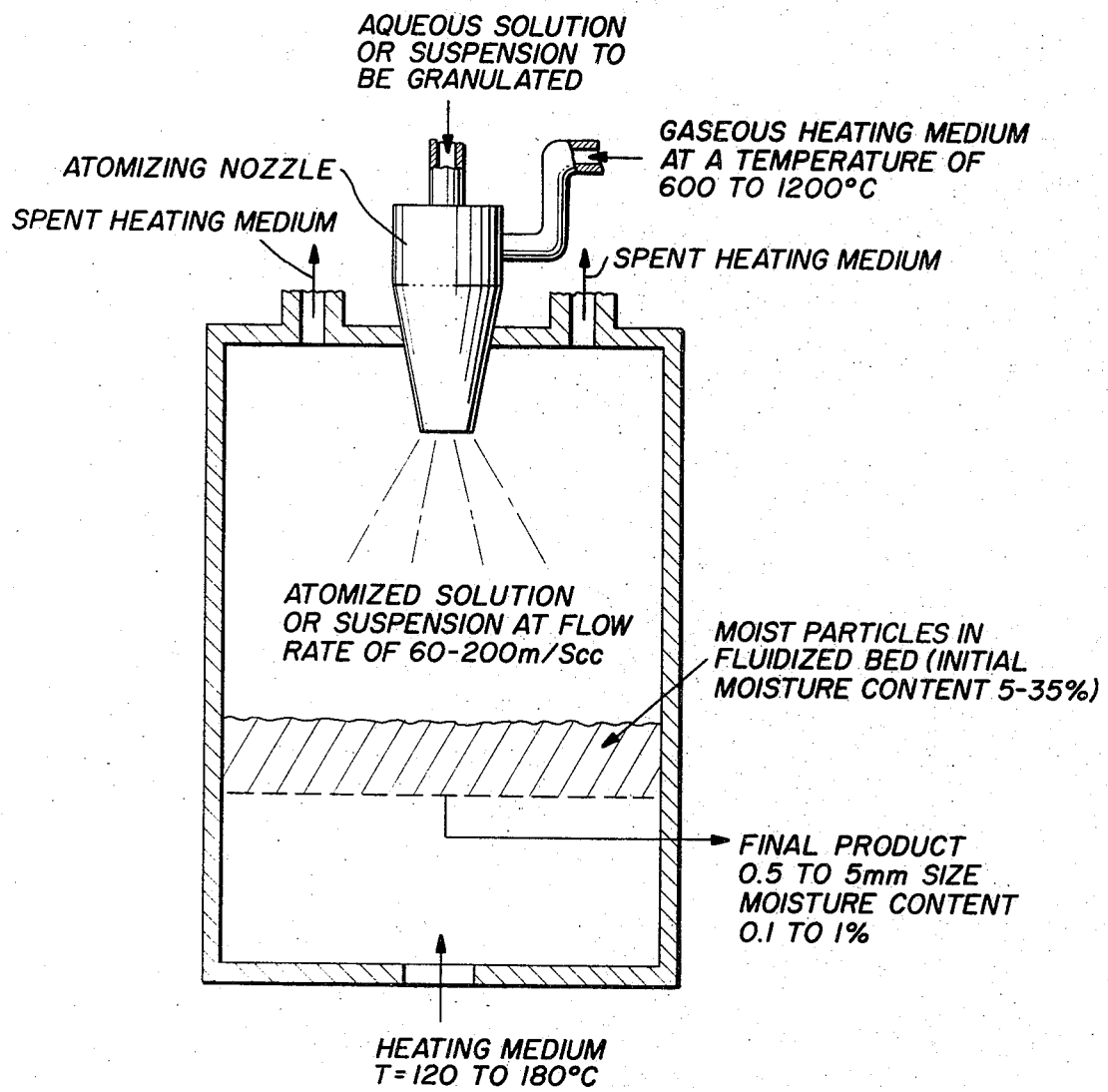

3,849,233

METHOD OF PRODUCTION OF GRANULATED PRODUCT

This application is a continuation of Ser. No. 47,156 filed June 12, 1970, now abandoned, which is in turn a continuation-in-part of Ser. No. 637,679 filed May 11, 1967, also abandoned.

BRIEF DESCRIPTION OF THE DRAWING

The sole FIGURE of the drawing is a diagrammatic elevational view of apparatus for effecting the method of production of granulated product according to the invention.

DETAILED DESCRIPTION

The present invention relates to methods of producing a granulated product which can find application in various branches of industry for producing the following products:

in the chemical industry — for producing nitrophos, nitrophoska, nitroammophos, nitroammophoska, ammophos, diammophos, calcium nitrate, calcium nitrite-nitrate, double superphosphate and other concentrated fertilizers; in the wood chemcial industry and in paper cellulose industry — for producing a viscosity-breaking agent employed in drilling engineering, in the tire industry, etc.; in the petrochemical industry — for dehydrating sodium sulfate and sodium sulfide; in nonferrous metallurgy — for dehydrating magnesium chloride, for utilizing slags after the melting of aluminum and in other branches of industry; in town management — for drying wet precipitate, activated sludge, etc.

Known in the art is a method of producing granulated product, according to which a solution or a suspension is atomized and injected by means of a nozzle into a drying drum equipped with an attachment adapted to create a continuous curtain of dry material in the path of the material being atomized, whereby granules are formed, which are then dried with the help of a gaseous heating medium.

Upon leaving the drying drum, the granulated product is dispersed, fractionated and classified.

Said method is disadvantageous in that a portion of the dry ready product is to be returned into the apparatus to be used for forming the curtain, the size of granules cannot be controlled within a narrow range, and it is necessary to disperse and fractionate the ready product.

Moreover, the known method is additionally disadvantageous in that it involves a rather long drying process and considerable heat expenditure due to the fact, that drying of the material takes place mainly within the period when the rate of drying is dropping, and the temperature of the gaseous heating medium is limited by a certain upper limit which, for heat-sensitive materials, for example, lies within 250° to 300°C, and in case such a limit is not observed, the material is subject to decomposition.

An object of the present invention is to provide a method of producing granulated product, according to which the drying of solutions and suspensions is effected by means of a gaseous heating medium having a high temperature, so as to enhance the effectiveness of the drying process.

Another object of the present invention is to provide a method of producing granulated product, such that the size of the granules formed lie within a narrow range and can be controlled.

The above and other objects of the invention are accomplished in our method of producing granulated product proposed herein and residing in that solutions and suspensions are atomized by means of a gaseous heating medium with the formation of wet granules; the resulting granules are finally dried in a second gaseous heating medium at a temperature below the melting point or the decomposition temperature of the product.

The second gaseous heating medium serving for final drying of the granules is expediently fed in counter current to said wet granules which fall by gravity upon a fluidized bed of the granules thus formed, in which the granules are finally dried to a required moisture content by said second fluidizing gaseous heating medium rising through the fluidized bed.

The size of the granules can be controlled by varying the temperature and rate of flow of the gaseous heating medium used to atomize the solution or suspension. However the varying of one or simultaneously both of said operating variables (temperature and rate of flow) has an effect on the specific consumption rate of the gaseous heating medium, (i.e. on the weight rate of the gaseous heating medium per kg. of the suspension or solution being atomized) so that the weight rate of the gaseous heating medium can be regarded as the factor controlling the size of the resulting granules.

The present method is effected as follows.

An aqueous solution or suspension to be granulated is introduced into an atomizer arranged in the upper portion of a vertical tower in such a manner that the flow of said solution or suspension is directed downwards.

A gaseous heating medium is fed to the atomizer concurrently with the solution or suspension and in a flow parallel thereto, said gaseous heating medium being obtained by combusting a fluid fuel in a furnace that operates at a pressure of 1000 to 1200 mm water column.

The gaseous heating medium outflows from the atomizer at a rate of 60 to 200 m/sec. and has a temperature up to 1,200°C. Due to the above-specified rate of outflow of the gaseous heating medium from the atomizer, the falling masses of the solution or suspension become disintegrated and form particles.

These particles, due to a uniform mixing thereof with the high-temperature gaseous heating medium, lose their moisture in a short period of time amounting to 0.1 to 0.2 sec., and, becoming dried, are transformed into wet granules with a residual moisture content of 5 to 35 percent. The size of these granules depends on the temperature of the gaseous heating medium and its rate of flow.

The main amount of the moisture, that is, 65 to 95 percent of the total amount thereof in the solution or suspension, is removed therefrom during the period of the constant rate of drying, whereby the material is protected against thermal decomposition when use is made of a gaseous heating medium whose temperature is up to 1,200°C.

For the wet granules which fall by gravity to be finally dried, the heating medium is fed in counter current to the fluidized bed of the granules, wherein the granules are finally dried to a required moisture content (0.1 to 1 percent).

The present method makes it possible to effect drying of solutions and suspensions by means of a gaseous heating medium having a temperature of 600° to 800°C for treating heat-sensitive materials, and a temperature of 1100° to 1200°C for treating thermostable materials, which, as compared to the known method in which a gaseous heating medium is employed having a temperature of 250° to 300°C, provides for a greater effectiveness of the drying process.

The present method makes it possible to reduce the size of the process equipment, since the granulation and drying of the material can be carried out in one apparatus, the dispersion, fractionation and classification of the ready product being obviated.

The method proposed herein enables the obtaining of 90 percent of the granules formed to lie within a narrow range, without recourse to recycling.

Moreover, the method proposed herein provides for controlling the size of the granules, The granules produced can be of a size from 0.5 to 5 mm., depending on the requirements.

For a better understanding of the present invention, given hereinbelow are examples illustrating the present method of producing granulated product.

EXAMPLE 1

Production of Granulated Monoammonium Phosphate

Fed into an atomizer is a gaseous heating medium having a temperature of 750°C. Simultaneously a solution of monoammonium phosphate having 40 percent water content is fed thereinto.

The specific consumption of the gaseous heating medium is maintained to be 0.7 kg per kg of the monoammonium phosphate solution being atomized, and the rate of outflow of the gaseous heating medium from the atomizer is adjusted to be 135 m/sec. Under said conditions, the drying of particles of the atomized monoammonium phosphate solution results in the formation of wet granules with a residual moisture content of 10 to 15 percent. The obtained granules are finally dried in a fluidized bed to a moisture content of 0.5 percent.

A counterflowing gaseous heating medium which serves for the final drying of the granules to 0.5 percent moisture content has a temperature of 120° to 150°C. The amount of granules of a size between 1 to 3 mm in the completed product is 90 percent.

EXAMPLE 2

Production of Granulated Nitroammophoska with the Ingredient Ratio $N:P_2O_2:K_2O = 17:17:17$ An atomizer is fed with a gaseous heating medium having a temperature of 800°C. Simultaneously a suspension of nitroammophoska having 25 percent moisture is fed into the atomizer.

The specific consumption of the heating gaseous medium is 1.2 kg per kg of the nitroammophoska suspension being atomized. The rate of outflow of the gaseous heating medium from the atomizer is 120 m/sec.

Under said conditions, granules of nitroammophoska are obtained with a residual moisture content of 8 to 10 percent.

The granules thus obtained are finally dried in a fluidized bed to a moisture content of 0.6 to 0.8 percent.

The counterflowing heating gaseous medium, serving for final drying of the granules to a moisture content of 0.6 to 0.8 percent, has a temperature of 150°C.

The amount of granules of a size between 1 and 4 mm in the finished product is 95 percent.

EXAMPLE 3

Production of Granulated Magnesium Chloride

An atomizer is fed with a gaseous heating medium whose temperature is 950° to 1000°C.

Simultaneously fed into the atomizer is a 70 percent solution of $MgCl_2.6H_2O$.

The specific consumption of the gaseous heating medium is 0.8 kg per kg of the solution of $MgCl_2.6H_2O$ being atomized. The rate of outflow of the gaseous heating medium from the atomizer is 140 m/sec.

Under said conditions, granules of magnesium chloride are produced with a residual moisture content of 17.7 percent ($MgCl_2.2H_2O$).

The counterflowing gaseous heating medium serving to dry the granules to a moisture content of 4.4 percent ($MgCl_2.0.5H_2O$) has a temperature of 170° to 180°C.

The amount of granules of a size between 1 and 4 mm in the finished product is 95 percent.

We claim:

1. A method of producing a granulated product from liquid solutions or suspensions, said method comprising atomizing the solution or suspension in a downwardly directed stream of a first gaseous heating medium to effect preliminary drying of the thus atomized solution or suspension until the moisture content of the particles formed will be within the range of 5 to 35 percent; gravitationally supplying the thus preliminarily dried particles to a fluidized bed which is fluidized by a second gaseous heating medium flowing counter currently to the atomized stream, and finally drying the formed particles in the fluidized bed by the said second gaseous heating medium flowing upwardly thru said bed to form granules with a preset moisture content, the temperature of said first gaseous heating medium and the ratio of its rate of flow to that of said liquid solution or suspension being selected for controlling the size of the obtained granules within the range of 0.5 to 5.0 mm, with a yield of 90–95 percent of the fraction of the desired size, said first heating medium being supplied at a temperature of 600°C to 1200°C, and the second said gaseous heating medium being supplied at a temperature below the melting point or decomposition temperature of the final desired product.

2. A method as claimed in claim 1 wherein said preset moisture content is 0.1–1 percent.

3. A method of producing a granulated product from liquid solutions or suspensions, said method comprising atomizing the solution or suspension in a downwardly directed stream of a first gaseous heating medium to effect preliminary drying of the thus atomized solution or suspension until the moisture content of the particles formed will be within the range of 5 to 35 percent; gravitationally supplying the thus preliminarily dried particles to a fluidized bed which is fluidized by a second gaseous heating medium flowing counter currently to the atomized stream, and finally drying the formed particles in the fluidized bed by the said second gaseous heating medium flowing upwardly thru said bed to form granules with a preset moisture content, the ratio of the rates of flow of said first and second gaseous heating media being selected for controlling the size of the granules within the limits of 0.5 to 5.0 mm, with a yield of 90–95 percent of the fraction of the desired size, said first heating medium being supplied at a temperature of 600°C to 1200°C, and the second said gaseous heating medium being supplied at a temperature below the melting point or decomposition temperature of the final desired product.

4. A method as claimed in claim 3 wherein said preset moisture content is 0.1–1 percent.

* * * * *